United States Patent
Welten

(10) Patent No.: US 9,228,702 B2
(45) Date of Patent: Jan. 5, 2016

(54) LED LAMP COMPRISING LIGHT GUIDE INCLUDING FIRST AND SECOND DIFFUSING SURFACES

(75) Inventor: Petrus Johannes Maria Welten, Oss (NL)

(73) Assignee: ELDOLAB HOLDING B.V., Son en Breugel (NL)

( * ) Notice: Subject to any disclaimer, the term of this patent is extended or adjusted under 35 U.S.C. 154(b) by 1021 days.

(21) Appl. No.: 13/257,839

(22) PCT Filed: Mar. 23, 2010

(86) PCT No.: PCT/NL2010/000052
§ 371 (c)(1),
(2), (4) Date: Sep. 20, 2011

(87) PCT Pub. No.: WO2010/110652
PCT Pub. Date: Sep. 30, 2010

(65) Prior Publication Data
US 2012/0014111 A1    Jan. 19, 2012

Related U.S. Application Data

(60) Provisional application No. 61/162,436, filed on Mar. 23, 2009.

(51) Int. Cl.
*F21V 5/04*    (2006.01)
*F21K 99/00*   (2010.01)
*F21V 3/00*    (2015.01)
(Continued)

(52) U.S. Cl.
CPC ... *F21K 9/52* (2013.01); *F21K 9/50* (2013.01); *F21K 9/56* (2013.01); *F21V 3/00* (2013.01); *G02B 6/001* (2013.01); *G02B 6/0035* (2013.01); *G02B 6/0073* (2013.01); *F21Y 2101/02* (2013.01); *F21Y 2113/005* (2013.01)

(58) Field of Classification Search
CPC ......... F21V 5/002; F21V 5/004; F21V 5/005; F21V 5/007; F21V 5/008; G02B 5/0205–5/0231; G02B 6/12004
USPC .............................. 362/269.08, 331, 332, 582
See application file for complete search history.

(56) References Cited

U.S. PATENT DOCUMENTS 6,350,041 B1 * 2/2002 Tarsa et al. .................... 362/231
6,520,670 B2 * 2/2003 Liang et al. ................... 362/555
(Continued)

FOREIGN PATENT DOCUMENTS

GB    2429514 A     2/2007
JP    2005032579 A  2/2005
(Continued)

*Primary Examiner* — Ismael Negron
*Assistant Examiner* — Leah S Macchiarolo
(74) *Attorney, Agent, or Firm* — Browdy and Neimark, PLLC

(57) ABSTRACT

An LED lamp is described, the LED lamp comprising an LED unit, e.g. provided on a base, in an embodiment, a fitting for contacting a power supply, and a light guide arranged to receive a light beam from the LED unit and guide the light beam towards a first light diffusing surface thereby providing a diffused light beam and whereby the light guide further comprises a second light diffusing surface facing the first light diffusing surface for diffusing at least part of the diffused light beam. The LED lamp as described enables to provide an omnidirectional light distribution, comparable to the light distribution of a conventional filament based light bulb.

15 Claims, 12 Drawing Sheets

(51) Int. Cl.
*F21V 8/00* (2006.01)
*F21Y 101/02* (2006.01)
*F21Y 113/00* (2006.01)

(56) References Cited

U.S. PATENT DOCUMENTS

| | | | |
|---|---|---|---|
| 8,070,329 B1 * | 12/2011 | Bechtel et al. | 362/331 |
| 8,128,267 B2 * | 3/2012 | Sormani et al. | 362/555 |
| 8,258,524 B2 * | 9/2012 | Tan et al. | 257/95 |
| 8,292,445 B2 * | 10/2012 | Richardson | 362/84 |
| 8,482,186 B2 * | 7/2013 | Wang et al. | 313/116 |
| 8,575,836 B2 * | 11/2013 | van de Ven | 313/512 |
| 8,628,220 B2 * | 1/2014 | Boonekamp et al. | 362/305 |
| 8,714,784 B2 * | 5/2014 | Luo | 362/311.12 |
| 8,807,799 B2 * | 8/2014 | Li et al. | 362/299 |
| 2002/0024823 A1 * | 2/2002 | Liang et al. | 362/558 |
| 2003/0081431 A1 * | 5/2003 | Brunfeld | 362/582 |
| 2005/0225988 A1 | 10/2005 | Chaves et al. | |
| 2010/0315802 A1 * | 12/2010 | Richardson | 362/84 |
| 2012/0250330 A1 * | 10/2012 | Kelly et al. | 362/308 |

FOREIGN PATENT DOCUMENTS

| | | |
|---|---|---|
| JP | 2007178581 A | 7/2007 |
| JP | 2008021461 A | 1/2008 |
| JP | 2008135210 A | 6/2008 |
| JP | 2008159453 A | 7/2008 |
| WO | WO 0140702 A1 | 6/2001 |

* cited by examiner

PRIOR ART

US 9,228,702 B2

LED LAMP COMPRISING LIGHT GUIDE INCLUDING FIRST AND SECOND DIFFUSING SURFACES

TECHNICAL FIELD

The present invention relates to the field of lighting applications, in particular to the field of LED based lighting applications.

BACKGROUND OF THE INVENTION

At present, conventional lighting applications such as light bulbs are being replaced by LED-based lighting applications. As such, LED lamps are known that are provided with a conventional screw fitting (e.g. an E27 fitting) and a base part in or near the screw fitting to house the electronics for driving the LED lamp. Such LED lamps are e.g. known from U.S. Pat. No. 6,227,679. U.S. Pat. No. 6,227,679 e.g. discloses an LED lamp having a base provided with a plurality of LEDs (as e.g. illustrated in U.S. Pat. No. 6,227,679) having different orientations as a single LED does not, in general, provide an illumination pattern substantially covering 360°. Typically, the base part of such an LED lamp can be comparatively large, and may thus prohibit light to be radiated in directions substantially towards and beyond the fitting. Therefore, replacing a conventional filament based light bulb of an existing light fixture by a known LED lamp may result in a changed, undesired illumination pattern. Phrased differently, a substantially omni-directional illumination pattern (as e.g. obtained from a filament light bulb) may be difficult to realise with known LED lamps; as such, known LED lamps are not suited to replace incandescent light bulbs in all current applications.

Furthermore, known LED-based lamps may have a substantially different appearance compared to filament based lamps. Therefore, in applications where the typical appearance of e.g. a filament based light bulb is desired or wanted, e.g. an application where the user has a direct view on the incandescent light bulb, a replacement of the existing light bulb by a known LED lamp may have a low acceptance by the user.

In view of the above drawbacks of known LED lamps, it is an object of the present invention to provide an LED lamp that is better suited to provide illumination conditions comparable to conventional light bulbs.

SUMMARY OF THE INVENTION

In accordance with the invention, there is provided an LED lamp comprising:
- an LED unit;
- a light guide arranged to receive a light beam from the LED unit and guide the light beam towards a first light diffusing surface thereby providing a diffused light beam;
- the light guide further comprising a second light diffusing surface facing the first light diffusing surface for diffusing at least part of the diffused light beam.

In accordance with the present invention, an LED unit comprises one or more LEDs (light emitting diodes). In an embodiment, the LED unit can e.g. comprise an RGB LED unit, such an LED unit comprising a red LED, a green LED and a blue LED, and optionally one or more white, amber or differently coloured LEDs. In an embodiment, the LED lamp further comprises a base provided with the LED unit. In such an embodiment, the LED unit of the LED lamp according to the invention can be mounted to the base which can, in an embodiment, be provided with electronics for powering or controlling the LED unit.

In an embodiment, the LED lamp further comprises a fitting for contacting a power supply, whereby the fitting is e.g. mounted to a base of the LED lamp.

In an embodiment, such a fitting can e.g. be an E27 or E14 screw fitting or a GU10 or MR-16 fitting for contacting a power supply, e.g. a 230 AC voltage or 12 or 24 DC voltage. Preferably, in such an embodiment, a base which is provided with the LED unit is mounted to or provided in the fitting.

It is further worth noting that in an embodiment, a base and fitting of the LED lamp according to the invention can be integrated as a single part; the base thus being a part of the fitting arranged to receive the LED unit. Depending on the size of the fitting and LED unit, the LED unit can be mounted outside the fitting or (partly) inside the fitting, optionally together with further electronic components for controlling the LED unit.

The LED lamp according to the invention is further provided with a light guide. As an example, the light guide can be made from a PERSPEX (poly(methyl methacrylate) resin (PMMA) or glass rod. The light guide of the LED lamp according to the invention is arranged to receive a light beam from the LED unit and guide the light beam towards a first light diffusing surface thereby providing a diffused light beam. Compared to the LED unit, the light diffusing surface provided by the light guide can emit light covering a comparatively large spatial area. In general, an LED provides a light source having a comparatively small area and high intensity whereby the light source covers a comparatively small spatial area. As such, in order to provide a light source substantially providing an omni-directional light distribution or a light distribution that is comparable to the light distribution of an existing incandescent light bulb, a plurality of LEDs directed light in different direction would be required. The light source as provided by the LED lamp according to the invention facilitates the provision of an omni-directional light source without the need of applying a plurality of LEDs or providing different orientations of the LEDs. It is further worth noting that the application of the light guide guiding the light beam towards the first diffusion surface provides more flexibility with respect to the positioning of the LED unit. Due to the light guide, the LED unit can be positioned on a base or base portion of the fitting (i.e. outside or (partly) inside the fitting) of the LED lamp.

In an embodiment, mounting the LED unit to the base or fitting facilitates the cooling of the LED unit. The application of a cooling body to the LED unit is essentially not restricted by the illumination requirements (e.g. providing an omni-directional light source) as the light beam of the LED unit is guided away from the LED unit towards the first diffusing surface, the diffusing surface distributing the light beam over a comparatively large spatial area. Phrased differently, an embodiment of the LED lamp according to the present invention enables the application of cooling means substantially without obstructing the light output of the LED lamp. It can therefore be stated that the LED unit of the LED lamp according to the present invention is more easily cooled than LED lamps as e.g. disclosed in U.S. Pat. No. 6,227,679 wherein a plurality of LED strings are applied to generate a substantially omni-directional light source. It is further worth noting that the visual appearance of the LED lamp according to the invention is not adversely affected by the application of cooling means. As the LED lamp according to the present invention can be more easily cooled, a lower average operating temperature can be realised. As known to the skilled person, by operating an LED unit at a lower average operating temperature, an increased life expectancy of the LED lamp can be realised.

It has been devised by the inventors that the application of a single diffusion surface may be insufficient to establish a light source that substantially provides a light distribution as can e.g. be obtained by a filament based light bulb. Therefore, in accordance with the present invention, the light guide further comprising a second light diffusing surface facing the first light diffusing surface for diffusing at least part of the diffused light beam. The light guide as applied in an LED lamp according to the invention, is provided with a second light diffusion surface arranged to receive at least part of the diffused light beam. By doing so, embodiments of the LED lamp according to the invention can emulate the appearance of a conventional light bulb in an improved manner compared to known LED lamps. To the beholder, it seams as if the light emitted originates from the first and second diffusing surfaces rather than from the base where the LED unit is mounted. As such, the application of the light guide as used in the LED lamp according to the invention results in a 'virtual' displacement of the light source, causing the beholder to see the light emanating from a different location that the true light source location. In an embodiment, the LED lamp according to the invention can thus have the same aesthetic appearance as a conventional light bulb thus avoiding acceptance issues with customers/users.

It can further be stated that the application of a light guide as described in the various embodiments of the present invention, can provide an improved mixing of the light output as provided by the LED unit. Often, an LED unit of an LED lamp will comprise a plurality of LEDs (either having the same or different colour light output). In conventional LED lamps, the individual LEDs of an LED unit are often observed as plurality of bright spots (e.g. of a different colour), even if a diffusing cover is applied to the LED lamp. The LED lamp according to the present invention substantially eliminates the appearance of such bright spots when observing the LED lamp.

In an embodiment of the present invention, the light diffusion surfaces are obtained by roughening surfaces of the light guide.

In general, various ways of manufacturing and conditioning the first and/or second diffusing surface can be considered in order to obtain the desired optical characteristics. As will be understood by the skilled person, a light beam may be partly transmitted when impacting a surface, may be partly diffused by the surface and may be partly reflected by the surface. By appropriate manufacturing and condition of the surface, the optical properties with respect to transmission, diffusion, reflection can be controlled.

In an embodiment, the first and/or second surface of the light guide as applied in the present invention are manufactured by an etching process. By doing so, a diffusing surface containing a plurality of very small cavities is obtained.

In an embodiment, the first and/or second surface of the light guide are processed by a printing or deposition technique. As an example, vapour deposition of metal can be applied to alter the optical characteristics of the first and/or second surface such as the balance between reflected and diffused light. As yet another example, the first and/or second surface can be coated with a phosphor or phosphorescent or fluorescent material in order to obtain the desired optical characteristics.

The light guide as applied in the LED lamp according to the invention can comprise of a single part or can comprise different members or parts. The light guide can e.g. comprise a first rod-shaped member whereby a first end portion of the rod-shaped member is arranged to receive the light beam from the LED unit and a second end portion of the rod-shaped member comprising the first light diffusing surface. A second rod-shaped member of the light guide may be arranged with a second light diffusing surface facing the first diffusing surface to receive at least part of the diffused light beam and further diffuse the at least part of the diffused light beam. As a further example, the light guide (e.g. rod-shaped) can be provided with a cavity providing the first and second diffusing surface.

Various embodiments of the light guide can be devised providing the advantages aforementioned.

In an embodiment, the first and second diffusing surfaces have a substantially conical shape. In such an embodiment, an inner angle of the first conical shaped surface can be different from an inner angle of the second conical shaped surface.

In accordance with the invention, the light guide can be provided in a bulb of the LED lamp similar to a conventional incandescent lamp bulb. Such a bulb can e.g. be made from transparent glass. The lamp bulb can equally have an opaque or semi-transparent surface such that the light guide cannot be observed directly by an observer. As such, the absence of an actual filament inside the LED lamp will not be noticed by an observer.

The bulb can e.g. be mounted to the fitting of the LED lamp thereby obtaining an LED lamp having substantially the same appearance as a traditional incandescent light bulb in the eye of the beholder. In an embodiment, the light diffusing surfaces of the light guide are arranged at substantially the same position as a filament of a conventional light bulb. In use, part of the light guide guiding the light beam toward the light diffusing surface will hardly light up but the diffusing surfaces will. As a result, in the eye of the beholder, it appears as if a standard glowing filament is applied at substantially the same position as in a traditional bulb. Due to the diffusion, the first and second light diffusing surfaces can provide a substantially omnidirectional illumination, comparable to the illumination as provided by a traditional incandescent light bulb.

It can be noted that, within the meaning of the present invention, light is not limited to visible light but may also include UV or IR light. As an example, the LED unit according to the invention can e.g. comprise one or more UV-light emitting LEDs. In order to generate visible light, the first and second diffusing surfaces can be provided with a phosphor or phosphorous material providing a frequency-shift of the light emitted by the LED unit.

In an embodiment, the base of the LED lamp according to the invention is provided with a control unit and a power converter. Such a control unit can be arranged to control the power provided to the LED unit thereby controlling an illumination parameter of the LED lamp. As an example, the power converter can e.g. be a Buck, Boost or Buck-Boost converter arranged to convert power from the power supply to an appropriate power for powering the LED unit. As an example, the power converter can convert the power supply into a substantially constant current source for powering the LED unit. The control unit can e.g. be arranged to control the intensity of the LED lamp by controlling the duty cycle at which the LED unit is operating. In case the LED unit is provided with multiple LEDs having different colours (e.g. an RGB LED unit), the colour of the light provided by the LED lamp can be controlled by operating the multiple LEDs at different duty cycles. Within the meaning of the present invention, different colour LEDs also include white LEDs having a different colour temperature.

Regarding the use of a control unit and power converter to control the power provided to the LED unit, it is worth noting that the miniaturisation of such components is an ongoing process. Depending on the application, a converter and control unit can e.g. be arranged to substantially fit into a conventional fitting such as an E27 fitting. In order to fit a converter and control unit for an LED unit comprising a plurality of LEDs into a fitting, it may be advantageous to provide a series connection of the LEDs and power the series connected LEDs by a single power converter rather than providing each LED of the LED unit with its own power converter. By providing parallel switches (e.g. FETs or MOSFETs) to the LEDs, the different LEDs of the LED unit can be operated independent of each other, e.g. at a different duty cycle.

In an embodiment of the present invention, the control unit is arranged to substantially provide an output colour of the LED unit according to the Planckian curve. A user input (e.g. an operation of a dimmer knob or a remote control unit) signal provided to the control unit can thus be interpreted as a set point for providing a light output at a certain colour temperature.

In an embodiment, the control unit is arranged to adjust the colour temperature of the LED lamp light output when the intensity of the light output is changed (e.g. in response to a user input). By doing so, the behaviour of a filament based light bulb can be emulated; when such a light bulb is operated at full intensity, the colour temperature of the light output is different (lower) compared to the situation when the light bulb is operated at a reduced intensity (dimmed). As such, an embodiment of the LED lamp according to the invention can be arranged to provide a 'cold' light output (having a comparatively high colour temperature) at high intensity levels and a 'warm' light output at low intensity levels (having a comparatively low colour temperature). Such an LED lamp can e.g. be provided with two (or more) different types of LEDs, each type providing substantially white light of a specific, different, colour temperature. By altering the respective duty cycle at which the two types of LEDs are operated, the colour temperature of the overall light output of the LED lamp can be adjusted. As the LED lamp according to the present invention can provide an improved mixing of light output emanating from different LEDs, a change from essentially operating a first LED of the LED unit (e.g. having a low colour temperature) to essentially operating a second LED of the LED unit will hardly or not be observed by a user or observer.

In accordance with the invention, an LED lamp according to the invention can comprise multiple light guides arranged in a common bulb, each light guide e.g. being arranged to guide and diffuse a light beam emitted by an LED of the LED unit. Alternatively, a single light guide can be arranged to guide and diffuse light emitted from multiple LEDs comprised in the LED unit. The LED lamp according to the invention can be arranged to have multiple diffusing locations either arranged in a single light guide or in each of a plurality of light guides. As such, various locations where the light output originates from (as observed by a beholder) can be arranged for either within a bulb or without the application of a bulb. By operating the LED lamp in such manner that the location where the light output originates from changes, attractive patterns can be provided. As an example, the LED lamp according to an embodiment of the invention can be used to emulate the appearance of a flame. Such an LED lamp may thus be applied instead of a candle in case an actual candle would pose a safety risk (e.g. the risk of a fire).

In an embodiment, the light guide is tile-shaped. In such an embodiment, the LED unit can e.g. comprise a plurality of LEDs arranged on opposite sides of the light guide.

In order to facilitate the cooling of the LED unit, the LED unit can be provided in close contact with the light guide. The light guide can e.g. be mounted to the base or the fitting, the LED unit can e.g. be mounted inside a cavity of the light guide at an end portion of the light guide. The light guide can be given favourable heat convection and radiation properties by an adequate choice of material(s).

To improve guiding the light beam emitted by the LED unit towards the first diffusing surface, the light guide can further comprise a reflector for guiding the light beam towards the first diffusing surface. Such a reflector can e.g. be mounted to the base and can e.g. have a conical shape.

Different embodiments and further advantages of the present invention are described in more detail below and are illustrated by the following figures.

DESCRIPTION

Figure 1:
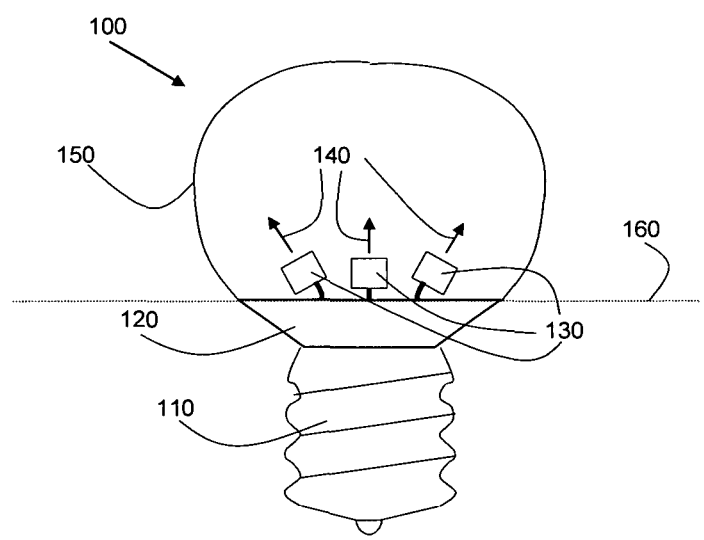
FIG. 1 schematically depicts an LED lamp as known in the art.

FIG. 1 schematically depicts an LED lamp 100 as known in the art. The LED lamp 100 as shown comprises a fitting 110 (a screw fitting) and a base 120 mounted to the fitting. Mounted to the base is a plurality of LEDs 130 arranged to provide a light beam in different directions, as indicated by the arrows 140. The LEDs and base are arranged in a bulb 150, e.g. a glass bulb.

Drawbacks of the LED lamp as known in the art are the requirement to apply multiple LEDs having different orientations rendering the LED lamp both complex and voluminous. Furthermore, it will be readily clear for the arrangement as shown in FIG. 1 that virtually no light is emitted downwards, i.e. below the dotted line 160. For some applications, the lack of light emitted downward, may result in the LED lamp as known in the art being unsuited as a replacement of a conventional light bulb.

Figure 2:
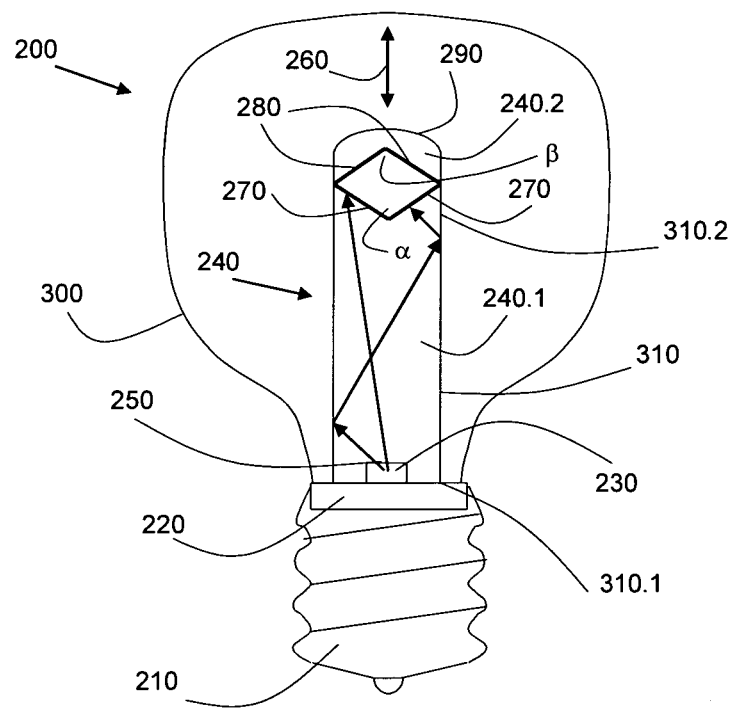
FIG. 2 schematically depicts a first embodiment of an LED lamp according to the present invention.

The LED lamp according to the present invention is arranged to alleviate or mitigate one or more of the drawbacks of the known LED lamp. FIG. 2 schematically depicts a first embodiment of an LED lamp 200 according to the invention. The LED lamp 200 comprises a fitting 210 and a base 220 mounted to the fitting 210. Mounted to the base 220 is an LED unit 230 arranged to emit a light beam into a light guide 240. The light guide 240, e.g. a bar or rod made from PERSPEX, comprises a first part 240.1 that receives the light beam (schematically indicated by the arrows 250) and guides the light beam along its longitudinal axis (indicated by the arrow 260) towards a first diffusing surface 270. The light guide part 240.1 guides the light along the longitudinal axis 260, while delivering hardly any light in a direction orthogonal to the longitudinal axis 260. Ensuring that the light for the LED unit is guided as much as possible along the longitudinal direction 260 can be improved by an appropriate choice of materials or treatment of the outer surface of the light guide (e.g. to improve a reflection of the light along lower part of the surface 310). The lower part of the surface 310, e.g. extending from position 310.1 on the base 220 to position 310.2, can be provided with a coating that provides an improved reflection of the light beam 250). In the embodiment shown, the first diffusing surface 270 has a substantially conical shape and is arranged to diffuse the light beam emanating from the LED unit. This can e.g. be realised by roughening the surface or by providing a saw-tooth pattern on the surface. Facing the first diffusing surface 270 is a second diffusing surface 280 of a second part 240.2 of the light guide 240. Phrased differently, the first and second diffusing surfaces are arranged adjacent to each other along the longitudinal direction 260. The second diffusing surface 280 also has, in the example shown, a conical shape, oriented in opposite direction (i.e. the apexes of the conical surfaces pointing away from each other). Part of the diffused light beam emanating from the first diffusing surface can be diffused by the second diffusing surface thereby providing an improved omnidirectional lighting distribution.

As can be seen in FIG. 2, an inner angle $\alpha$ of the first conically shaped diffusing surface 270 is substantially equal to the inner angle $\beta$ of the second conically shaped diffusing surface 280. It has been observed that by selecting an angle $\alpha$ larger than an angle $\beta$, more light can be obtained in the upper part of the light guide, i.e. part 240.2 of the embodiment of FIG. 2.

The second part 240.2 of the light guide ends in a rounded surface 290 dispersing light in different directions. With respect to the rounded surface 290, it is worth noting that the actual shape may be different and is not essential to obtain the advantages as provided by the LED lamp according to the invention. As an example, a conical shape could be considered as well.

It should however be noticed that, preferably, the outer surface 290 should not be flat, (i.e. in a plane perpendicular to the longitudinal axis of the light guide), in order to avoid acceptance issues from the user.

With respect to the conical shaped surfaces 270 and 280, other shapes can be selected as well, as is illustrated below.

In the embodiment shown, the base 220, the LED unit 230 and the light guide 240 are mounted into a bulb 300 which can substantially be the same as a traditional incandescent light bulb in the eye of the beholder. The bulb can e.g. be made from transparent or opaque or semi-transparent glass or any other suitable material. The fitting can e.g. be known fitting such as an E27 or E14 fitting. Preferably, the diffusing surfaces are provided in a position relative to the bulb comparable to the position where a filament would be positioned in comparable traditional light bulb. In use, because the light beam emitted by the LED unit is guided along the longitudinal axis, indicated by the arrow 260, only the first and second diffusing surfaces of the parts 240.1 and 240.2 of the light guide will light up; hardly any light will be emitted through the lower part of the outer surface 310 of the light guide part 240.1. As a result, in the eye of the beholder it appears as if there is a standard glowing filament present at substantially the same position in the bulb as with a traditional bulb. In addition, because of the substantially omnidirectional radiation obtained from the conical surfaces, the LED lamp is radiating light in all directions, substantially the same as for a traditional incandescent light bulb. In an embodiment, the LED unit can be provided with one or more white LEDs, e.g. having a warm white colour on the Planckian curve equivalent to the colour of a traditional incandescent light bulb. By doing so, most beholders will not observe the LED-based lamp to be different from a traditional filament based light bulb. As already stated above, instead of applying substantially white LEDs, the LED unit can be provided with UV-emitting LEDs whereas the diffusing surfaces are coated with a phosphor or phosphorous layer. By doing so, any light emitted through the lower part of the outer surface 310 of the light guide part 240.1 will not be observed by the human eye as it is outside the visible range. In order to obtain an essentially white light output, blue LEDs may equally be applied that, combined with a yellow or yellowish phosphor coating result in essentially white light. Depending on the nature of the power supply available at the fitting, the base can e.g. be provided with a power converter for converting the incoming power from the power supply to a form (e.g. a current source) suitable for powering the LED unit. In case an AC power supply is provided, the power converter can e.g. comprise a rectifier such as a full-bridge or half-bridge rectifier and optionally a transformer. The base of the LED lamp according to the invention can also be provided with a control unit arranged to control the LED unit and/or the power converter.

Such a control unit can e.g. be arranged to control the amplitude or duty cycle of the current provided to the LED unit in order to change the intensity of the LED lamp. Such a control unit can also be provided with a receiver for receiving input signals from a user interface (e.g. a remote control unit), whereby the control unit is arranged to adjust an illumination parameter of the LED lamp (e.g. an intensity or colour) in accordance with the received input signal.

Figure 3A:
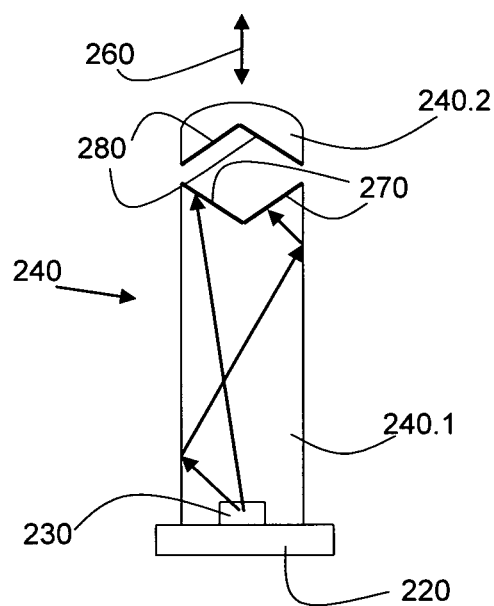
FIGS. 3a-3h schematically depict embodiments of light guides as can be applied in an LED lamp according to the invention.

FIGS. 3*a*-3*f* schematically depict different embodiments of a light guide, a base and an LED unit as can be applied in an LED lamp according to the invention. The embodiment as shown in FIG. 3*a* comprises (similar to the arrangement as shown in FIG. 2) a base 220, an LED unit 230 and light guide 240 comprising a first part 240.1 and a second part 240.2. In an embodiment of the LED lamp according to the invention, parts 240.1 and 240.2 of the light guide are displaceable relative to each other. Various options exist to displace both parts relative to each other. As an example, the second part 240.2 can e.g. be mounted to a bulb (not shown), similar to the bulb 300 as shown in FIG. 2, whereby the bulb is displaceable relative to the base of fitting (not shown) along the longitudinal direction 260 of the light guide 240. The second part 240.2 may equally be arranged to be rotated or tilted with respect to the first part 240.1 in order to obtain a certain illumination effect such as directing a beam of light into a desired direction.

It is further worth noting that, when the LED lamp according to the invention is provided with a bulb that is displaceable relative to the fitting, a displacement of the bulb may equally be applied as a kind of switch or selector to control an operational parameter of the LED lamp. Contrary to a conventional light bulb, a light bulb of an LED lamp according to the invention will substantially remain cool compared to a light bulb of a conventional lamp. As such, it can be touched and e.g. operated as a switch (e.g. by pushing, pulling or rotating the bulb relative to the fitting or base). Such a switch or selector can e.g. enable or disable the powering of the LED lamp or may allow selection of more complicated modes of operation such as modifying an intensity or colour of the LED lamp.

A displacement of both parts relative to each other can also be automated, e.g. by application of an actuator (e.g. an electromagnetic or piezo-electric actuator), e.g. arranged between both parts. By displacing the parts 240.1 and 240.2 of the light guide relative to each other, the light distribution of the LED lamp can be altered or adjusted. Similar to the arrangement as shown in FIG. 2, the light guide parts 240.1 and 240.2 are provided with diffusing surfaces 270, 280, arranged adjacent each other in the longitudinal direction 260.

Figure 3B:
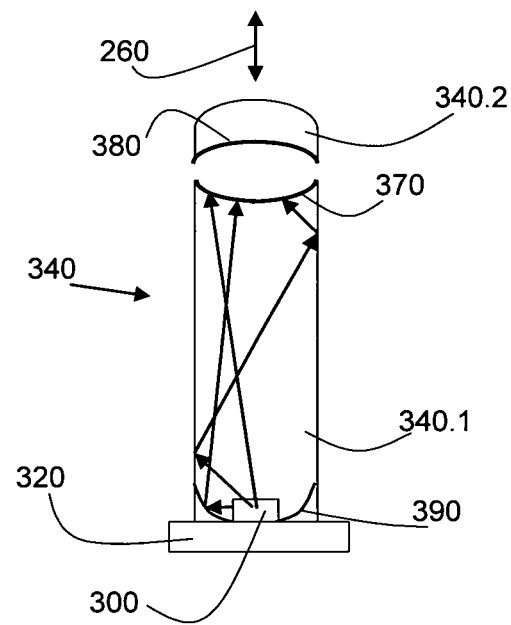

FIG. 3b schematically depicts another embodiment of the light guide as can be applied in an LED lamp according to the invention. The light guide 340 as schematically depicted also comprises a first part 340.1 and a second part 340.2, each part being provided with a diffusing surface 370 resp. 380, the diffusing surfaces facing each other. Similar to the arrangement of FIG. 2 or FIG. 3a, a light beam emitted by the LED unit 300 will be guided by the first part 340.1 towards the first diffusing surface 370 thereby forming a diffused light beam (not shown). Part of said diffused light beam is further received and diffused by the second diffusion surface 380. In the arrangement as shown, surfaces 370 and 380 are not conical but can e.g. describe part of a sphere. Using such an arrangement, similar effects and advantages as described above can be obtained. In the arrangement as shown, a reflector 390 is provided on the base 320, the reflector being arranged to deflect light emitted form the LED unit substantially towards the first reflective surface. As an example, the reflector can have a parabolic shape or describe part of a parabolic surface. In order to deflect a light beam emitted by the LED unit towards the first diffusing surface, the LED unit can e.g. be arranged in or near a focal point of the parabolic surface described by the reflector.

Figure 3C:
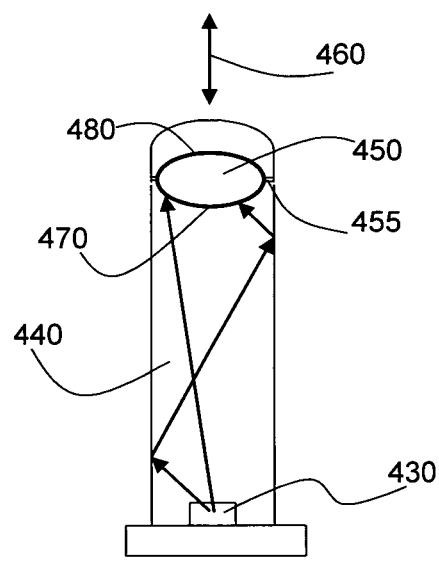

As an alternative to obtaining a light guide by combining two parts, a light guide can be manufactured as a single piece. As an example, FIG. 3c schematically depicts a light guide 440 having a cavity 450 inside. Such a cavity can e.g. be manufactured by providing a hole 455 through the light guide and etching the cavity 450 by introducing an etching substance to the interior of the light guide. As can be seen, such a cavity can be considered to have two diffusing surfaces 470 and 480, the surfaces facing each other or being arranged adjacent to each other along the longitudinal direction 460. A light beam emitted by the LED unit 430, substantially along the longitudinal direction 460 can be diffused by the surfaces 470 and 480 in essentially the same manner as described in FIGS. 2-3b. Such an arrangement does not require the assembly of two parts forming the light guide; the manufacturing of the light guide may thus be facilitated. Also in this example, the surfaces 470 and 480 can e.g. be provided with a phosphor or phosphorous or fluorescent coating to enable a frequency shift of the light emitted by the LED unit. Also in this example, a reflector can be provided to deflect a light beam emitted by the LED unit 430 towards the first diffusing surface 470.

In an embodiment, the cavity can be, entirely or partly, filled with a diffusing substance. Such a diffusing substance can e.g. be selected to (e.g. partially) absorb certain colours from the received light spectrum while diffusing others.

Figure 3D:
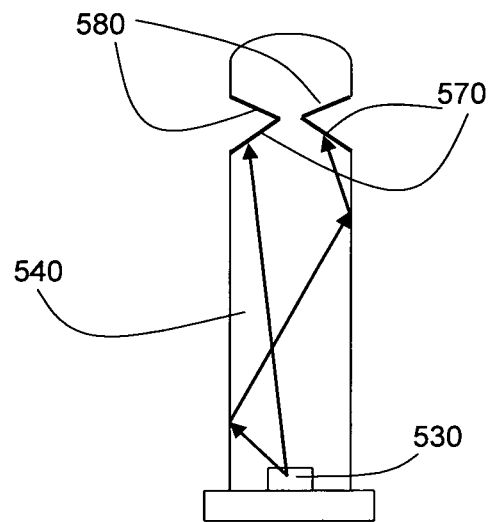

A further embodiment of a light guide as can be applied in an LED lamp according to the invention is schematically depicted in FIG. 3d. In the arrangement as shown, a light guide 540 is provided with a first and second diffusing surface 570 and 580 arranged to diffuse a light beam emitted by an LED unit 530. Similar effects and advantages as described above can be obtained by applying such a light guide in an LED lamp according to the invention.

Figure 3E:
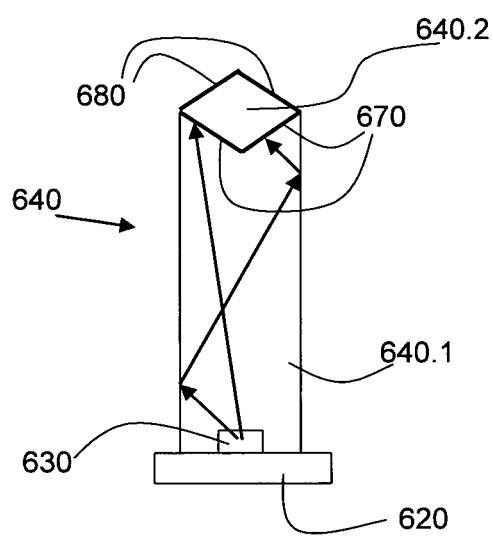

A yet further embodiment of a light guide as can be applied in an LED lamp according to the invention is schematically depicted in FIG. 3e. In the arrangement as shown, a light guide 640 is provided with a first and second diffusing surface 670 and 680 arranged to diffuse a light beam emitted by an LED unit 630 mounted to a base 620. The light guide 640 as shown comprises a first part 640.1 and a second part 640.2 which are mounted together at the surface 670. In the example shown, the second part 640.2 comprises two conical diffusing surfaces 670 and 680 arranged to diffuse a light beam emitted from the LED unit 630. Both parts 640.1 and 640.2 can be made from the same material or from a different material.

Figure 3F:
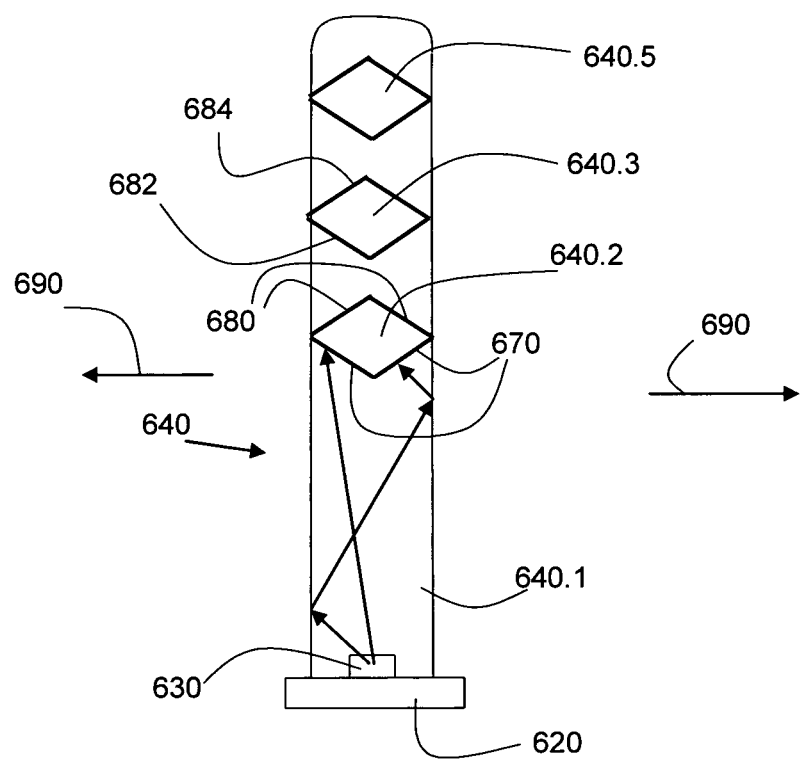

A yet further embodiment of a light guide as can be applied in an LED lamp according to the invention is schematically depicted in FIG. 3f. Similar to the arrangement as shown in FIG. 3e, a light guide 640 is provided with a first and second diffusing surface 670 and 680 arranged to diffuse a light beam emitted by an LED unit 630 mounted to a base 620. In addition to the first part 640.1 and the second part 640.2 which are mounted together at the surface 670, the embodiment as shown further comprises a third part 640.3 comprising a third diffusing surface 682 and a fourth diffusion surface 684. In the arrangement as shown, part of the light received by the second diffusing surface 680 can be received by the third diffusion surface 682 where a third diffusion occurs. Further on, part of the light diffused by the third diffusing surface 682 can subsequently be received by a fourth diffusion surface 684 where a fourth diffusion occurs, etc. . . . As shown, a further part 640.5 can be provided having two additional diffusing surfaces. The volumes between the pairs of diffusing surfaces (e.g. the first and second surface or the third and fourth) can be empty, thus actually forming cavities (as e.g. shown in FIG. 3a) or can be solid, as e.g. shown in FIG. 3e.

In a preferred arrangement of the embodiment as shown in FIG. 3f, the plurality of diffusing surfaces are processed in such manner such that the light emanating in a direction substantially perpendicular to the longitudinal direction of the light guide (indicated by the arrow 690) is substantially uniform along the longitudinal direction. Such a light distribution can be obtained by appropriate manufacturing of the sequence of diffusing surfaces such that substantially the same amount of light is directed outward by each of the diffusing surfaces.

In an embodiment, the diffusing surfaces are coated with a phosphor or phosphorous or fluorescent material. Various colour effects can be obtained by using different coatings for the plurality of diffusing surfaces.

With respect to the embodiment as shown, it is worth mentioning that items 640.2, 640.3 and 640.5 may be solid components (either made from the same material as 640.1 or not) or may be cavities as e.g. described in FIG. 3c.

Figure 3G:
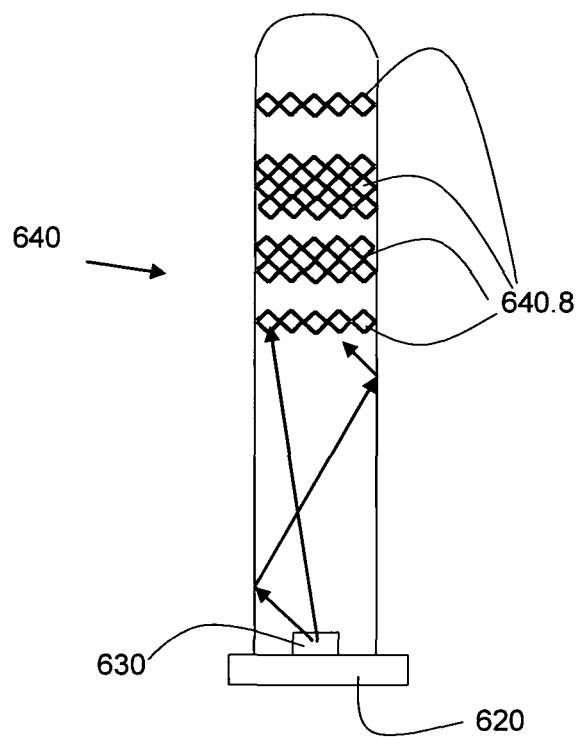

Instead of applying components or cavities 640.2, 640.3 and 640.5 which are comparatively large, a plurality of comparatively small cavities can be applied as well. Such cavities can be applied in a plurality of layers which can be distributed in a particular manner along the longitudinal direction of the light guide, in order to obtain a desired effect. Such an embodiment is schematically depicted in FIG. 3g. Similar to the arrangement as shown in FIG. 3e, a light guide 640 is provided arranged to diffuse a light beam emitted by an LED unit 630 mounted to a base 620. The light guide is further provided with a plurality of cavities 640.8, arranged in one or more layers thus obtaining a desired illumination profile along the longitudinal direction of the light guide 640. The cavities may be of a different size, e.g. per layer or in a direction perpendicular to the longitudinal axis of the light guide. Also, the layers may be positioned oblique or under an angle with respect to the longitudinal axis.

It will be apparent to the skilled person that, based on the above exemplary embodiments, various alternative arrangements and shapes of the first and second diffusing surfaces can be devised without departing from the scope of the invention.

Figure 3H:
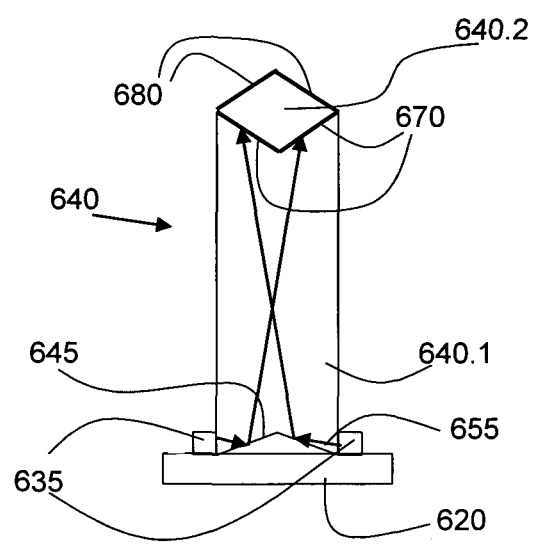

Further, it is worth noting that the LED unit can be positioned at different locations relative to the light guide. As an alternative to the arrangements as shown in FIGS. 3a-3g, the LED unit can e.g. be arranged along the circumference of the light guide. FIG. 3h schematically depicts such an arrangement whereby corresponding components of the embodiment of FIG. 3d are indicated using the same reference numbers. Different from the arrangement of FIG. 3d, the LED unit 635 as mounted to the base 620 is arranged along the circumference of the light guide directing a light beam as indicated by the arrows 655. In order to facilitate directing the light emitted by the LED unit 635 toward the diffusing surfaces 670 and 680, a reflective surface 645 can be provided e.g. on the light guide 640 near the base 620.

Figure 4A:
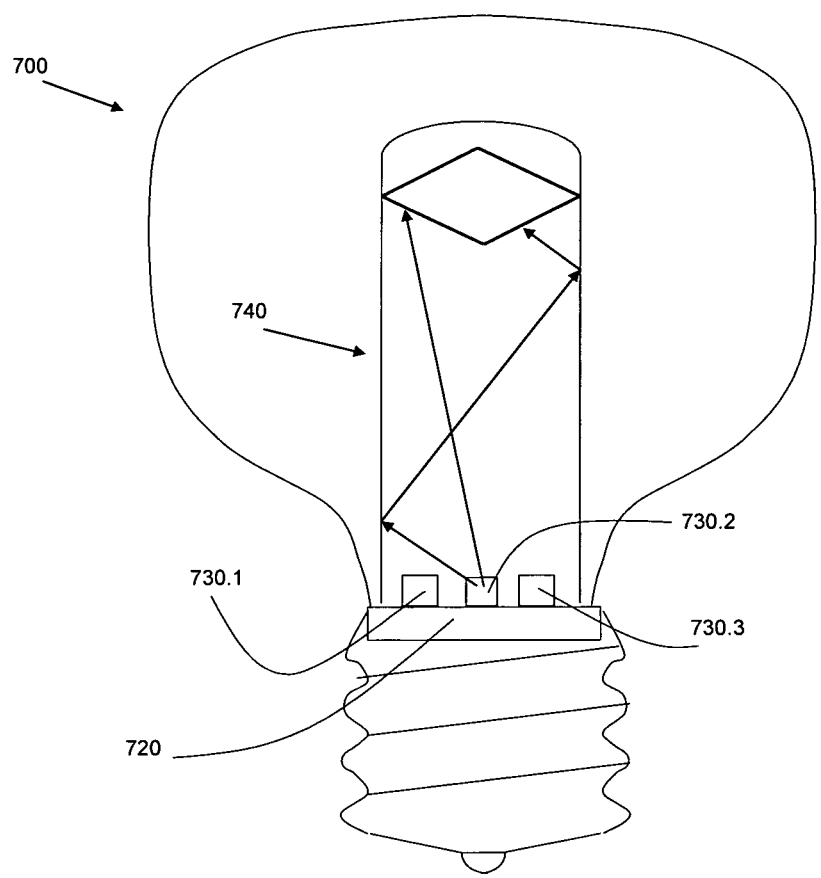
FIGS. 4a-4d schematically depict further embodiments of an LED lamp according to the invention.

FIG. 4a schematically depicts a further embodiment of an LED lamp 700 according to the invention, the LED lamp 700 comprising three LED units (in general, two or more LED units) 730.1, 730.2 and 730.3 mounted to a base 720 and arranged to emit a light beam into a common light guide 740, common to the three LED units. Each LED unit can e.g. comprise one or more LEDs of a designated colour. By providing a common light guide to the different LEDs of the LED unit, an improved colour mixing can be realised. As such, when in use observing the diffusing surfaces (which are perceived by an observer as the location from which the light originates), substantially no distinct light sources (e.g. through the occurrence of bright or brighter spots) are observed; only one substantially homogeneous light source is observed.

Figure 4B:
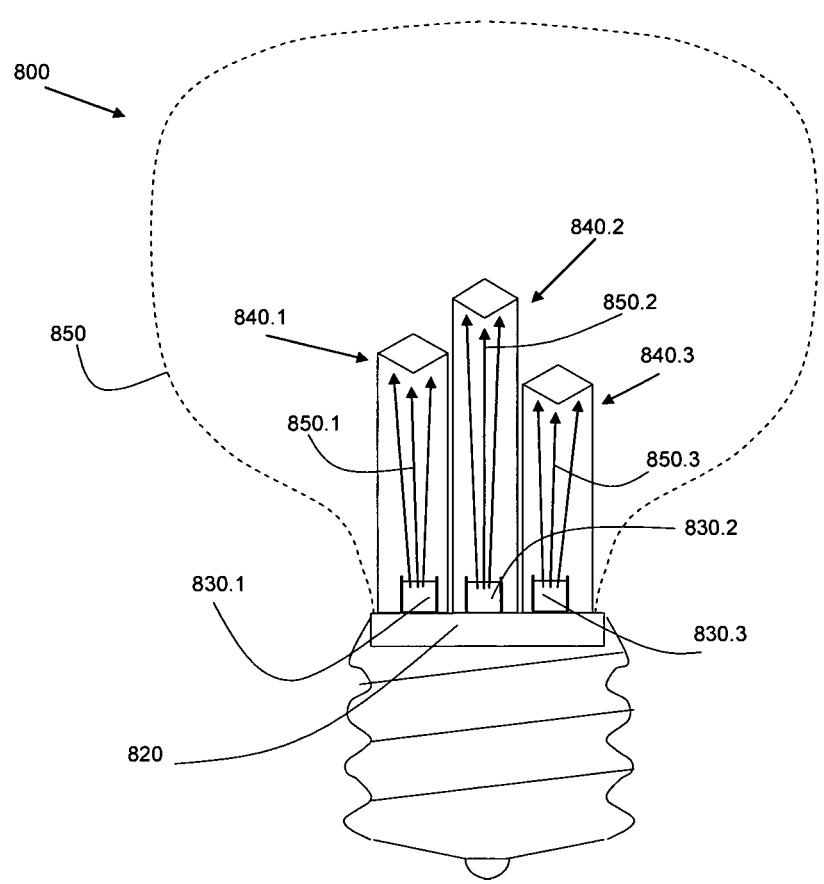

As an alternative, an LED lamp according to the invention can be provided with a plurality of LED units, each unit being provided with a light guide, the LED units and light guides e.g. mounted to a common base. Such an example is schematically depicted in FIG. 4b. The LED lamp 800 as shown comprises three LED units (in general, two or more LED units) 830.1, 830.2 and 830.3 mounted to a base 820 and arranged to emit a light beam (indicated by the arrows 850.1, 850.2 and 850.3) through a respective light guides 840.1, 840.2 and 840.3. In the embodiment as shown, the light guides correspond to the light guide as shown in FIG. 3e although other light guides (e.g. as shown in FIGS. 3a-3d) can be applied as well. As can be seen in FIG. 4b, the different light guides have a different length thereby resulting in different diffusing locations (substantially corresponding to the location of the diffusing surfaces of the light guides) for the light emitted by the different LED units. As such, by operating the LED units sequentially, it will appear to the observer that the light source displaces. By appropriate modelling of the light guides and appropriate operation the different LED units, certain visual effects can be obtained such as, as an example, the emulation of a flame of a candle. As schematically indicated, the LED lamp as shown can optionally be provided with a bulb (indicated by the dotted line 850) enclosing the light guides.

As a further or alternative visual effect, the LED lamp as schematically shown in FIG. 4b may be applied to provide so-called task-lighting towards different distinct locations. At present, there is a tendency in domestic lighting applications to apply a combination of an ambient illumination at a comparatively low intensity combined with a dedicated illumination directed at particular, comparatively small areas or locations, such as the illumination of a reading spot or chair. Such a combination of ambient light and dedicated light (also known as task-lighting) may be preferred over an overall ambient light at an elevated intensity as it enables to create a preferred mood or atmosphere and may result in a decreased power consumption. In order to provide such a task-lighting using the LED lamp as shown in FIG. 4b, the light guides 840.1, 840.2 and 840.3 can be arranged to provide an illumination in a dedicated direction instead of providing a substantially omnidirectional lighting. This can e.g. be realised by providing a reflective screen adjacent the light guides directing the light as generated at the diffusing surfaces in a particular direction. As an alternative, part of the diffusing surfaces can be provided with a reflective coating in order to direct the diffused light in a particular direction. As such, by activating any of the LED units 830.1, 830.2 or 830.3 or a combination thereof, a particular lighting distribution is obtained.

Figure 4C:
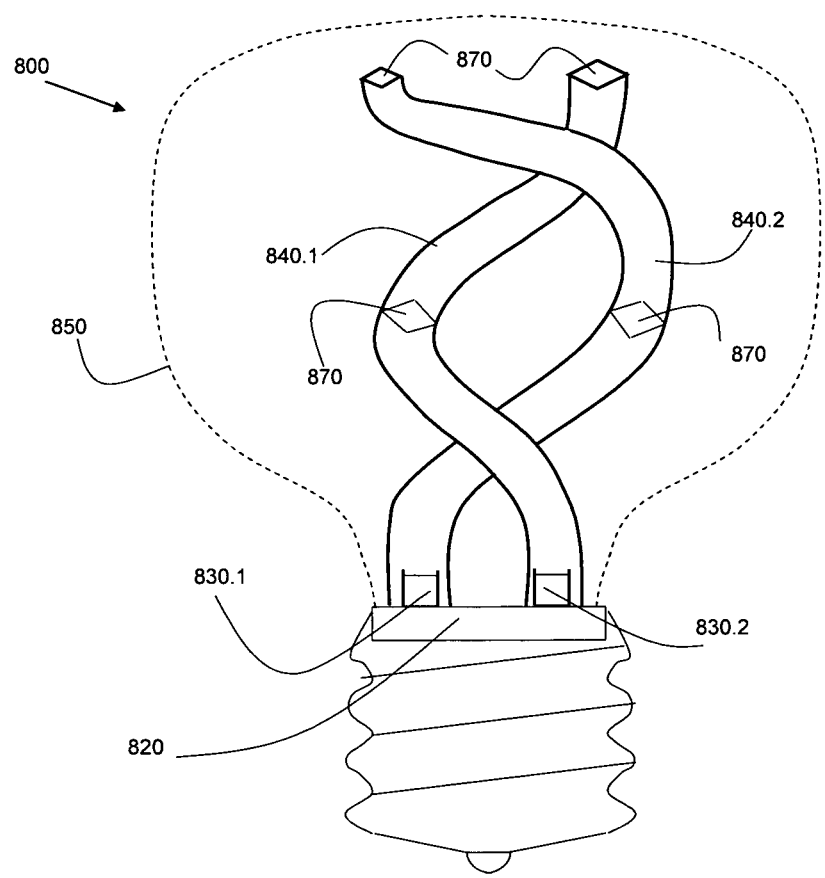

With respect to the shape of the light guide as shown in the previous embodiments, it can be noted that the light guides need not be straight but may be bent as well. As an example, instead of applying three substantially straight light guides as e.g. shown in FIG. 4b, the light guides can e.g. be rod shaped structures that are twisted about each other. Such an embodiment is schematically depicted in FIG. 4c showing an LED lamp 800 comprising two LED units (in general, two or more LED units) 830.1 and 830.2 mounted to a base 820 and arranged to emit a light beam through their respective light guides 840.1 and 840.2. In the embodiment as shown, the light guides may have a different length and may have (similar to the arrangement of FIG. 3f or 3g) different and/or multiple diffusing locations 870 (substantially corresponding to the location of the diffusing surfaces of the light guides) for the light emitted by the different LED units. As each location can e.g. be provided with a (different) phosphor or phosphorous material and each LED unit can be operated at a different duty cycle, various optical effects (such as the emulation of a flame) can be obtained.

Figure 4D:
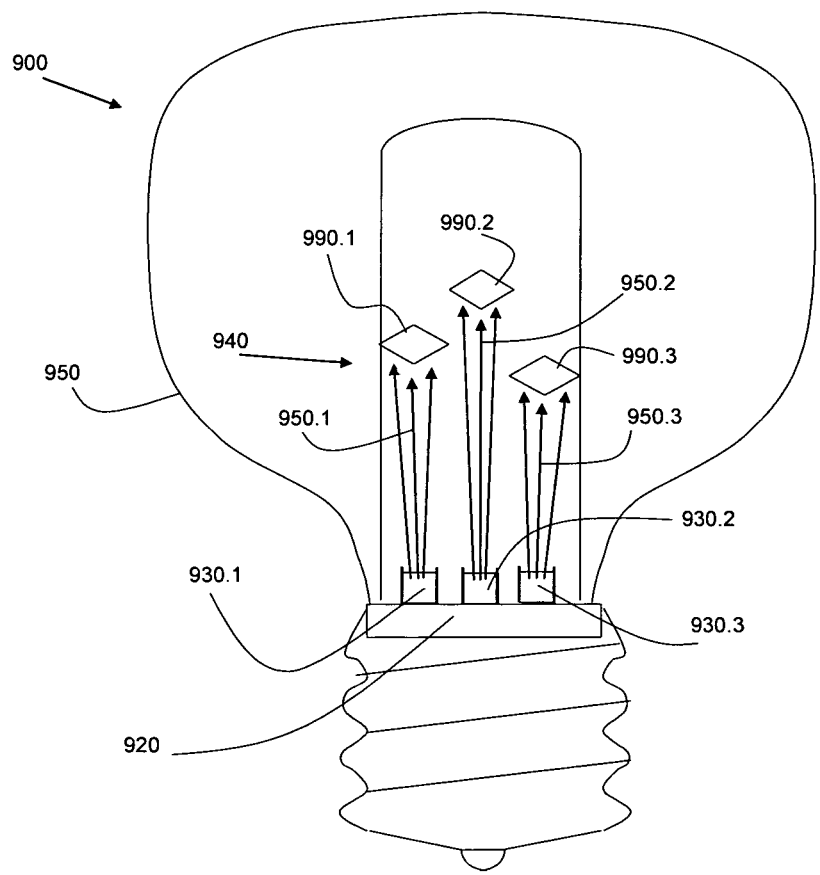

It is worth noting that the effect of realising different diffusing locations (i.e. different pairs of diffusing surfaces at different locations) can also be realised with a single light guide common to two or more LED units. Such an arrangement is schematically depicted in FIG. 4d. The LED lamp 900 as shown comprises three LED units (in general, two or more LED units) 930.1, 930.2 and 930.3 mounted to a base 920 and arranged to emit a light beam (indicated by the arrows 950.1, 950.2 and 950.3) through a common light guides 940 towards different diffusing locations 990.1, 990.2 and 990.3 respectively. As an example, the different diffusing locations can e.g. be obtained by etching cavities (as e.g. explained in FIG. 3c) in different locations in the light guide 940, each cavity thus forming a first and second diffusing surface for diffusing the light emitted by one of the LED units. In order to ensure that the light emitted by an LED unit is substantially received at only one of the diffusing locations 990.1, 990.2 and 990.3, means for focussing the light emitted by the LED units may be required. Such focussing means can e.g. comprise reflectors or lenses. As schematically indicated, the LED lamp as shown can optionally be provided with a bulb 950 enclosing the light guide.

Note that the arrangement as shown in FIG. 4c may equally be applied, in a similar manner, to obtain so-called task-lighting as described above.

Figure 5:
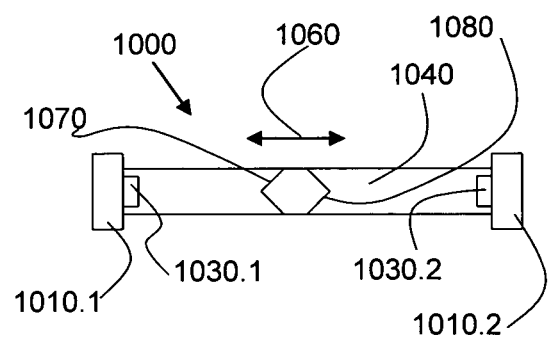
FIG. 5 schematically depicts yet a further embodiment of an LED lamp according to the invention.

FIG. 5 schematically indicates yet another embodiment of an LED lamp according to the invention. The LED lamp 1000 comprises a fitting 1010 comprising a first part 1010.1 and 1010.2 arranged near end portions of a longitudinal light guide 1040. Each part of the fitting 1010 further serves as a base for mounting LED units 1030.1 and 1030.2 respectively, the LED units being arranged to emit a light beam into the light guide, essentially along a longitudinal axis (indicated by the arrow 1060) of the light guide. The light guide is further provided with two diffusing surfaces 1070 and 1080 arranged to diffuse the light emitted by the LED units. The diffusing surfaces 1070 and 1080 can e.g. be realised as indicated in the light guide embodiments as shown in FIGS. 3a-3h. With respect to the lamp as schematically shown in FIG. 5, it is worth noting that, similar to the arrangements as shown in FIGS. 3f and 3g, the light guide 1040 can have a plurality of pairs of diffusing surfaces or cavities arranged along the longitudinal direction 1060. In an embodiment, the LED lamp as shown can have a cylindrical shaped light guide 1040. As such, the LED lamp can e.g. be applied to replace conventional TL lighting. Note that the LED lamp as shown may have more than one light guide as well.

Figure 6:
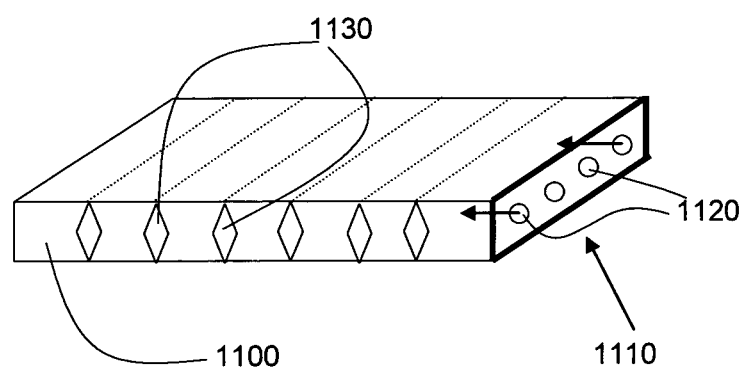
FIG. 6 schematically depicts yet a further embodiment of an LED lamp according to the invention having a tile-shaped light guide.

As an alternative to providing a cylindrical shaped light guide, a tile shaped light guide can be considered as well. In such an arrangement, the light guide is assumed to extend in a direction perpendicular to the plane of the Figure. As such, the LED units 1030.1 and 1030.2 can comprise a plurality of LEDs arranged in the direction perpendicular to the plane of the Figure. In FIG. 6, such a tile shaped LED lamp is schematically shown. The lamp comprises a tile shaped light guide 1100 and a first LED unit 1110 arranged on a base mounted to the side of the tile, provided with a plurality of LEDs 1120 directing light inward in a plane parallel to the tile, the light guide being provided with a plurality of cavities 1130 providing diffusing surfaces for diffusing the light emitted by the LED unit 1110. A second LED unit (not shown) can e.g. be provided on an opposite side of the tile also directing light inwards toward the cavities 1130. It is worth noting that multiple layers of such a construction having mutually orthogonal or other directions, can be used as well. Instead of having a monolithical structure, the tile-shaped light guide can be manufactured as an assembly of a plurality of light guide components forming the tile-shaped light guide.

Figure 7:
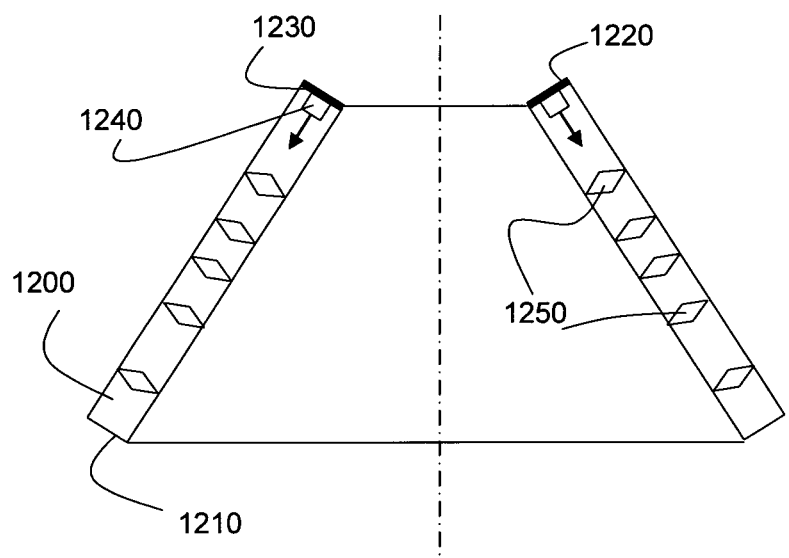
FIG. 7 schematically depicts yet a further embodiment of an LED lamp according to the invention having a tubular shaped light guide.

Alternative shapes of the LED lamp may also be considered, as e.g. shown in FIG. 7. As shown, the light guide 1200 has a tubular shape with circular end-sections 1210 and 1220 of different sizes. On either (or both) end-section(s), an LED unit 1240 comprising one or more LEDs can be mounted for directing light into the light guide. The LED or LEDs of the LED unit can e.g. be mounted to a base. The light guide as shown being provided with a plurality of cavities 1250 providing diffusing surfaces for diffusing the light emitted by the LED unit 1240.

The LED lamp according to the present invention can be applied as a replacement for traditional incandescent lights in substantially all current applications as it can provide substantially the same lighting distribution. It can further be noted that the LED lamp according to the present invention results in substantially the same aesthetic experience when observing the light bulb resulting in virtually no acceptance issues with customers/users. At the same time, the LED lamp according to the invention can include additional control features that are typical to the application of LED technology, such as:
  colour control,
  intensity control
  integrated networking capabilities, e.g. using IR, visible light, RF or PLC, substantially without requiring changes to existing wiring.

As such, the LED lamp according to the invention can be applied in every current situation in which an incandescent light bulb is used in which it is considered important to substantially maintain the known light bulb shape or visual position of the light source within the bulb, or light colour and/or colour temperature, or light radiation direction, in particular an omnidirectional light distribution. Further, the LED lamp according to the present invention enables the realisation of certain visual effects such as, as an example, the emulation of a flame of a candle, by appropriate modelling of the light guide(s) and appropriate operation the LED unit or units.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage. The term coupled, as used herein, is defined as connected, although not necessarily directly, and not necessarily mechanically.

The invention claimed is:

1. An LED lamp comprising:
  an LED unit;
  a light guide arranged to receive a light beam from the LED unit and guide the light beam towards a first light diffusing surface thereby providing a diffused light beam;
  the light guide comprising
    a second light diffusing surface facing the first light diffusing surface for diffusing at least part of the diffused light beam,
    a first member, wherein the light beam is received at a first end surface of the first member of the light guide, a second end surface of the first member comprising the first diffusing surface,
    a second member,
    a first end surface of the second member comprising the second diffusing surface, and
  wherein the first and second member are selectively displaceable relative to each other during use to realize desired illumination effects.

2. The LED lamp according to claim 1, further comprising a base provided with the LED unit.

3. The LED lamp according to claim 2 further comprising a fitting for contacting a power supply and whereby the base is mounted to the fitting.

4. The LED lamp according to claim 2, wherein the light guide is mounted to the base.

5. The LED lamp according to claim 2, wherein the base further comprises a control unit for controlling an illumination parameter of the LED unit and a power converter for converting power from the power supply to power for the LED unit.

6. The LED lamp according to claim 1, wherein the light beam is received along a longitudinal axis of the light guide.

7. The LED lamp according to claim 1, wherein the light guide comprises a rod.

8. The LED lamp according to claim 7 wherein the rod is made from Perspex or glass.

9. The LED lamp according to claim 1, wherein one of the first light diffusing surface and the second light diffusion surface has a conical shape.

10. The LED lamp according to claim 1, wherein the light guide comprises a cavity forming the first and second light diffusing surface.

11. The LED lamp according to claim 1, wherein the light guide is provided in a bulb of the LED lamp.

12. The LED lamp according to claim 1, wherein the LED unit comprises an RGB LED unit.

13. The LED lamp according to claim 1, further comprising a fitting for contacting a power supply and whereby the base is mounted to the fitting, wherein the fitting is an E27 or E29 screw fitting or a GU10 or MR-16 fitting.

14. The LED lamp according to claim 1, wherein the light guide further comprises a reflector for guiding the light beam towards the first diffusing surface.

15. The LED lamp according to claim 14, wherein the reflector comprises a parabolic surface.

* * * * *